(12) United States Patent
Tosco

(10) Patent No.: US 6,399,032 B1
(45) Date of Patent: Jun. 4, 2002

(54) PLANT FOR CONTINUOUSLY REGENERATING FOUNDRY SAND AND ASSOCIATED METHOD

(75) Inventor: Bartolomeo Tosco, Almese (IT)

(73) Assignee: Fata Aluminium Division of Fata Group SPA, Turin (IT)

( * ) Notice: Subject to any disclaimer, the term of this patent is extended or adjusted under 35 U.S.C. 154(b) by 0 days.

(21) Appl. No.: 09/371,859

(22) Filed: Aug. 11, 1999

(30) Foreign Application Priority Data

Aug. 11, 1998 (EP) .............................. 98830497

(51) Int. Cl.$^7$ ................................... B01J 8/08
(52) U.S. Cl. .................... 422/232; 422/238; 422/311
(58) Field of Search ................... 422/178, 232, 422/239, 311; 164/5, 456; 134/2; 34/582, 585, 586

(56) References Cited

U.S. PATENT DOCUMENTS

| | | | |
|---|---|---|---|
| 4,068,389 A | 1/1978 | Staffin et al. | ............... 34/582 |
| 5,404,655 A | 4/1995 | Godderidge et al. | .......... 34/367 |
| 5,806,206 A | 9/1998 | Christian | ................... 34/585 |

FOREIGN PATENT DOCUMENTS

| | | |
|---|---|---|
| DE | 29720478 U | 1/1998 |
| EP | 0089927 A | 9/1983 |
| EP | 0 122 029 A2 * | 10/1984 |
| EP | 0593229 A | 4/1994 |
| GB | 2155802 A | 10/1985 |

* cited by examiner

Primary Examiner—Marian C. Knode
Assistant Examiner—Alexa A. Doroshenk
(74) Attorney, Agent, or Firm—Sughrue Mion, PLLC

(57) ABSTRACT

The plant for continuously regenerating foundry sand comprises a combustion chamber, in which a combustible gas is added to the sand, and a cooling chamber, in which the sand coming from the combustion chamber is cooled, both chambers being provided with systems for maintain the sand in a fluidized state. The chambers are also in direct communication with one another in the manner of communicating vessels in such a way that, during normal operation in equilibrium, the free surface of the sand may be at the same level in the two chambers.

9 Claims, 2 Drawing Sheets

PLANT FOR CONTINUOUSLY REGENERATING FOUNDRY SAND AND ASSOCIATED METHOD

BACKGROUND OF THE INVENTION

The present invention relates to a plant for continuously regenerating sand which has previously been used in foundries for the manufacture of cores.

According to techniques generally used for the production of complicated metal components by melting, the molten metal is injected into modules containing cores which reproduce the internal shape of the components.

To go into more detail, special resins, for example of the phenolic type, and suitable catalysts which permit the curing thereof, are mixed with the sand in order to give the cores firmness.

In recent years, it has been found to be economically advantageous to recycle the sand used for the production of such cores, after removing the residues of resins, catalysts and other impurities contained therein.

Thus, plants have already been produced for the regeneration of foundry sand, as illustrated, for example, in EP-A-0 055 230. Some of those plants operate continuously and may comprise a combustion chamber, in which a combustible gas is added to the sand in order to enable the above-mentioned impurities to be burnt, and a cooling chamber, in which the sand coming from the combustion chamber is cooled to ambient temperature or slightly above ambient temperature.

According to a first known technique, those chambers, in which the sand is maintained in a fluidised state, are arranged inside separate containers between which the transfer of sand takes place by gravity, via suitable valves and without the provision of any additional device for thermal recovery.

That arrangement has the disadvantage of high operating costs owing to the substantial consumption of energy (of the order of 50 $m^3$ of combustible gas per tonne of treated sand). In addition, the fact that the cooling is carried out in a single stage means that it is of long duration, in order to enable the sand to be cooled from a temperature of approximately 700–800° C., which is characteristic of the combustion stage, to the final desired temperature of approximately 30–35° C.

Furthermore, the movement by gravity from one chamber to the other means that the plant must have a substantial vertical bulk (of the order of 7–10 m) which is not always compatible with the space available.

According to a further known technique, illustrated by EP-A-0 089 927, regeneration plants of the type indicated above are completed by thermal recovery devices which use the considerable heat of the streams of material leaving the combustion chamber to preheat the incoming streams of material.

Plants of the last-mentioned type are thus much more efficient in terms of energy than are the previous plants because they provide for a consumption of combustible gas of the order of 30 $m^3$ per tonne of treated sand, but they are also much more expensive and functionally complex. This is due to the fact that the heat exchange devices, in addition to constituting additional components that have to be manufactured using valuable materials, such as stainless steels, are also intrinsically delicate, being subject to a very high degree of wear and thus requiring careful maintenance which involves not inconsiderable machine stoppage times.

Moreover, plants of the last-mentioned type also have the disadvantages of having a substantial bulk in the vertical direction and poor versatility.

SUMMARY OF THE INVENTION

In order to overcome the above-mentioned disadvantages of the known techniques, the present invention relates to a plant for regenerating foundry sand and to the associated method of operation which have the characteristics claimed specifically in the following claims.

BRIEF DESCRIPTION OF THE DRAWINGS

Advantages and characteristics of the present invention will become clear from the following detailed description which is given with reference to the appended drawings provided by way of non-limiting example, in which.

DETAILED DESCRIPTION OF THE INVENTION

Figure 1:
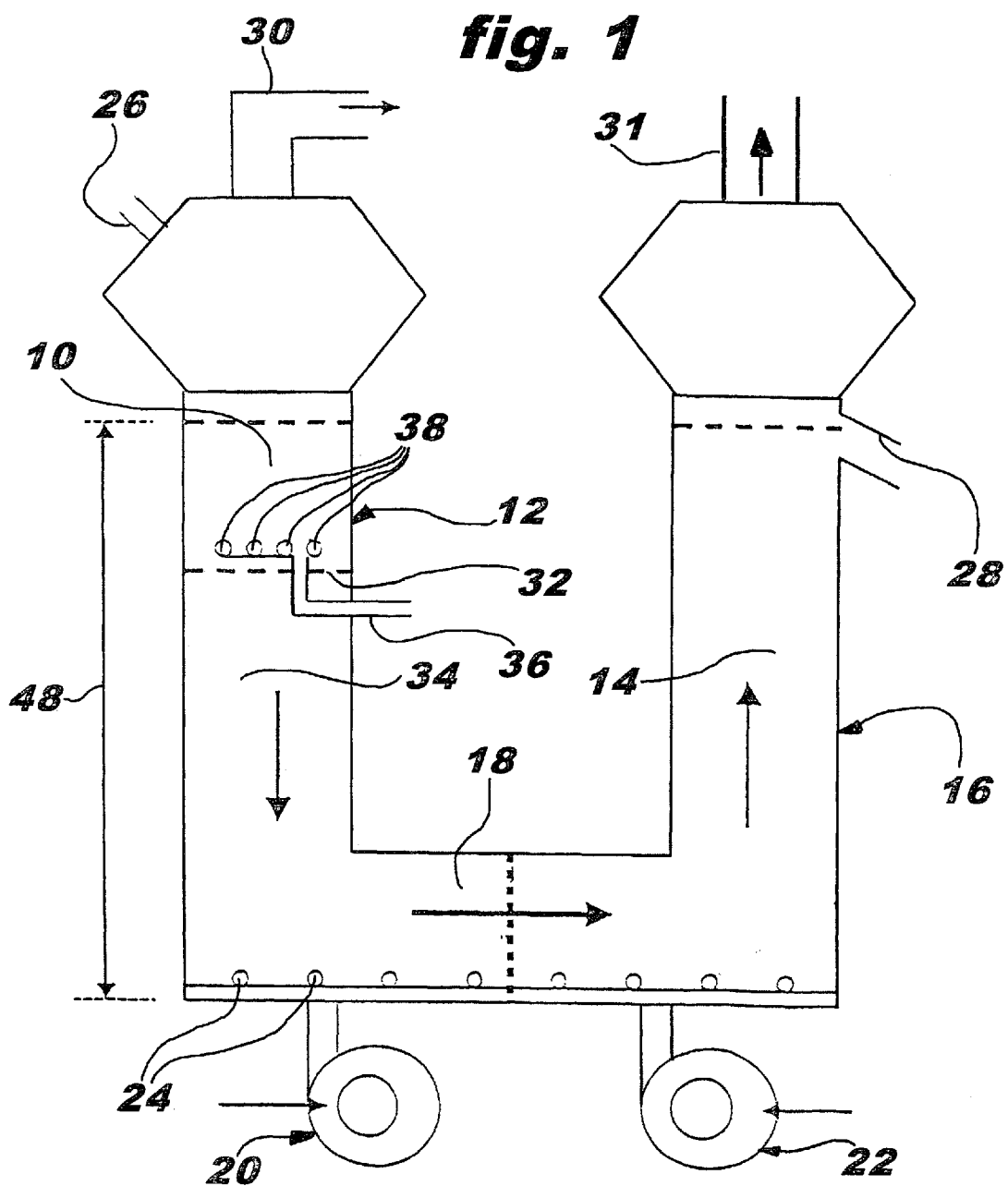
FIG. 1 is a diagrammatic representation of a plant of the invention.

A plant for continuously regenerating foundry sand comprises (FIG. 1) a combustion chamber 10 which is arranged inside the top of a first column 12 and a cooling chamber 14 which is arranged inside a second column 16, the base of which is connected by a communicating duct 18 to the base of the first column 12.

Respective fans 20, 22 are arranged in the area of the bases of the columns 12, 16 and are capable of blowing air through feed nozzles 24 in such a manner as to maintain the sand in a fluidised state inside the combustion chamber 10 and the cooling chamber 14. As will become clear from the following description of operation, the two columns 12, 16 constitute a system of communicating vessels in which the fluidised sand, which is comparable to a liquid, tends to reach the same level.

A device 26 for introducing the sand to be regenerated is arranged above the first column 12, while an opening 28 for discharging the regenerated sand is formed at the top of the second column 16. A duct 30 for discharging the combustion gases extends from the top of the column 12. A duct 31 for discharging the fluidisation air from the chamber 14 extends from the top of the column 16.

A perforated transverse baffle 32 for separating the combustion chamber 10 from the underlying portion 34 of the column 12 is also arranged in the first column 12.

The baffle 32 has holes of a diameter such as to permit a rate of passage of the fluidisation air of not greater than 1 m/s and thus such as to permit the descent by gravity of the sand in the grain sizes normally used in foundries for the manufacture of cores.

A gas feed duct 36 leads into the combustion chamber 10 through a plurality of nozzles 38, the openings of which are provided with means for preventing the penetration of sand into the inside.

Those means may be constituted (FIGS. 2 and 3) by diaphragms 40 of ceramic material permeable to gas but not to sand, or, in variants which are not illustrated, by plates having holes of a diameter of preferably from 0.1 to 0.15 mm.

Figure 2:
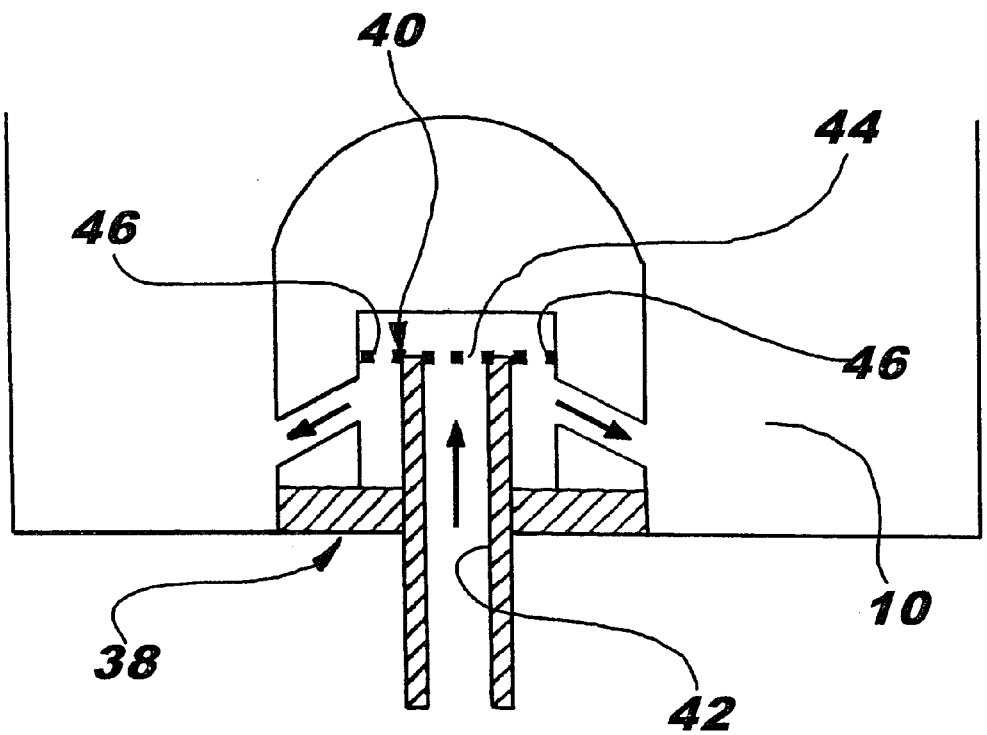
FIG. 2 is a diagrammatic representation on an enlarged scale of a detail of the plant of FIG. 1.

As illustrated in FIG. 2, each nozzle 38 has a U-shaped path 42 for the flow of the gases, on which path the diaphragm 40 is arranged in such a manner as to divide it into at least two series-arranged portions 44, 46 in order to constitute a double barrier to undesired penetration of sand into the inside thereof.

Figure 3:
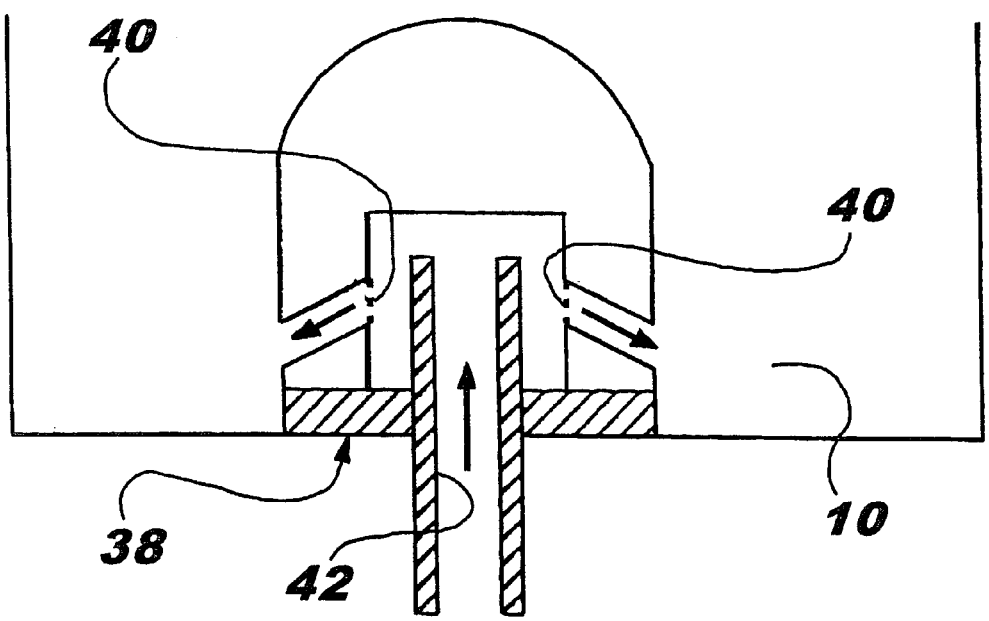
FIG. 3 is a diagrammatic representation of an alternative embodiment of the detail of FIG. 2.

A structure of that type thus offers better protection against such penetration than does the structure illustrated in FIG. 3, which shows two diaphragms 40 arranged in parallel along the path 42 of flow inside the nozzle 38.

The functioning of the plant just described is as follows. The sand which has been used in a foundry and is charged with residues of resins, catalysts and various impurities is fed by the device 26 to the top of the first column 12 and into the combustion chamber 10 which also receives combustible gas through the nozzles 38 and air blown by the fan 20 through the nozzles 24 arranged on the base of the column 12.

The thermodynamic and fluid-dynamic conditions necessary for triggering and maintaining combustion reactions of the impurities mixed with the sand are produced in the combustion chamber 10. In particular, it is possible to provide that the inflow of combustible gas into the chamber 10 is controlled automatically in such a manner that it decreases or even stops when the temperature tends to rise above the desired value of approximately 700° C., and increases in the opposite case.

The fact that the openings of the nozzles 38 are provided with diaphragms 40 or other similar blocking-off means prevents the pressure that prevails inside the combustion chamber 10 from forcing grains of sand into the nozzles, even when the supply of combustible gas ceases.

A critical parameter of the regeneration process is the rate of air flow inside the column 12 which has to be such that the grains of sand are maintained in a state of fluidisation.

Experimental tests have shown that sand grain sizes of, for example, from 0.15 to 0.5 mm require an air flow rate of from 0.2 to 1 m/s because, at rates higher than 1 m/s, the downward fall of the sand is prevented while, at values lower than 0.2 m/s, the granules of sand are not fluidised.

The passage of material (sand and air) between the combustion chamber 10 and the underlying portion 34 of the column 12 is regulated by the holes formed on the baffle 32 and by the state of fluidisation which is established in the column.

The dimensions of those holes are such as to permit the descent of the grains of sand and, at the same time, to bring about a rate of upward air flow in the range of from 0.2 to 1 m/s, bursting any air bubbles generated in the course of the ascent of the fluidisation air, which would otherwise explode in an undesired manner in the combustion chamber 10. Such an explosion would drive the grains of sand randomly in all directions and in particular also towards the bottom beyond the baffle 32, without the grains remaining in the chamber 10 for the time necessary to complete the combustion reactions.

The portion 34 of the column 12 acts as a heat exchanger permitting the preheating of the air blown upwards by the fan 20 at the expense of the considerable heat of the sand coming from the combustion chamber 10.

The sand then continues to flow, still in a fluidised state, through the duct 18 and the second column 16 where it is driven upwards towards the discharge opening 28 by the air blown by the fan 22, while continuing to cool gradually.

The two columns 12, 16 thus act as a system of communicating vessels in which the admission of sand at the top of the column 12 there creates a head 48 and consequently an overpressure which causes sand to flow towards the column 16 which is filled until the sand, which is now cold, is discharged through the opening 28. Under normal operating conditions, the level of the free surface of the sand in the two columns 12, 16 is equal and is determined by the height at which the opening 28 is arranged.

Owing to the presence of the two separate fans 20, 22 which are capable of producing the same pressure in the two chambers 10, 14, the fluid-dynamic conditions of normal operation of the plant are those of stable equilibrium and tend to be restored even if there are disturbances such as any stoppage of fluidisation.

Whenever such a disturbance takes place in the cooling chamber 14, sand is caused to flow towards the combustion chamber 10, with a reduction in the quantity of sand present in the chamber 14, until the stoppage is removed and the fluidisation conditions are restored.

As a whole, the plant of the invention, while not providing for the presence of expensive additional devices for thermal recovery, such as heat exchangers or other fluidised beds of stainless steel, nevertheless succeeds in effecting such recovery so that a more than satisfactory energy efficiency is obtained with low operating and maintenance costs.

Nor does the plant of the invention, which operates on the principle of communicating vessels, have to be extended in height, so that its bulk in the vertical direction is substantially reduced compared with that of conventional plants.

Finally, the fact that the plant of the invention does not require heat exchangers and stainless steel valves not only reduces its cost but also increases its versatility, because those devices have to be produced precisely for each specific plant size.

Naturally, the principle of the invention remaining the same, the details of construction and forms of embodiment may be varied widely with respect to those described purely by way of example, without thereby departing from the scope of the invention.

What is claimed is:

1. A plant for continuously regenerating foundry sand, comprising a combustion chamber, in which a combustible gas is added to sand to be regenerated in the combustion chamber, and a cooling chamber, in which the sand coming from the combustion chamber is cooled, both chambers being provided with means for maintaining the sand in a fluidised state, wherein the combustion chamber is arranged inside the top of the first column and cooling chamber is inside a second column, the base of which is connected by a communicating duct to the base of the first column whereby, during normal operation in equilibrium, the free surface of the sand is at the same level in the two chambers.

2. A plant according to claim 1, wherein respective fans capable of blowing air into the columns in such a manner as to maintain the sand in a fluidised state there are arranged in the area of the bases of the first and second columns.

3. A plant according to claim 1, wherein device for introducing the sand to be regenerated is arranged above the first column, while an opening for discharged the regenerated sand is formed at the top of the second column.

4. A plant according to claim 3, wherein a perforated transverse baffle for separating the combustion chamber from the underlying portion of the column is arranged in the first column.

5. A plant according to claim 4, wherein the baffle has holes of a diameter such as to permit a rate of passage of the fluidisation air of not greater than 1 m/s.

6. A plant according to claim 1, wherein at least one nozzle for supplying combustible gas leads into the combustion chamber and its opening is provided with means for preventing the penetration of sand into the inside thereof.

7. A plant according to claim 6, wherein the means for preventing the penetration of sand into the nozzle are constituted by a diaphragm of ceramic material permeable to gas but not to sand.

8. A plant according to claim 7, wherein the nozzle has a U-shaped path for the flow of gas, on which path the diaphragm is arranged in such a manner as to divide it into at least two series-arranged portions.

9. A method for operating the plant for regenerating foundry sand of claim 1 comprising:

supplying foundry sand to be regenerated to the top of a combustion chamber;

heating the sand in the combustion chamber;

maintaining the sand in the combustion chamber and the sand leaving the bottom of the combustion chamber in a fluidized state;

supplying the sand to the bottom of a cooling chamber;

and maintaining the sand in the cooling chamber in a fluidized state wherein the surface of the sand is maintained at the same level in the two chambers during operation of the plant.

* * * * *